United States Patent
Bhagavathiperumal et al.

(10) Patent No.: US 11,848,840 B1
(45) Date of Patent: Dec. 19, 2023

(54) SYSTEMS AND METHODS FOR ACCURATE MONITORING AND REPORTING OF FLOWS IMPACTED DUE TO LINK FAILURES IN DATA CENTERS

(71) Applicant: Aviz Networks, Inc., San Jose, CA (US)

(72) Inventors: Chidambaram Bhagavathiperumal, Livermore, CA (US); Vishal Shukla, San Jose, CA (US)

(73) Assignee: Aviz Networks, Inc., San Jose, CA (US)

( * ) Notice: Subject to any disclaimer, the term of this patent is extended or adjusted under 35 U.S.C. 154(b) by 0 days.

(21) Appl. No.: 18/104,265

(22) Filed: Jan. 31, 2023

Related U.S. Application Data

(63) Continuation-in-part of application No. 18/101,074, filed on Jan. 24, 2023.

(51) Int. Cl.
*H04L 43/026* (2022.01)
*H04L 43/0823* (2022.01)
*H04L 43/062* (2022.01)

(52) U.S. Cl.
CPC .......... *H04L 43/062* (2013.01); *H04L 43/026* (2013.01); *H04L 43/0823* (2013.01)

(58) Field of Classification Search
None
See application file for complete search history.

(56) References Cited

U.S. PATENT DOCUMENTS

| | | | | |
|---|---|---|---|---|
| 7,865,410 B1* | 1/2011 | Chandrupatla | ........ | G06Q 20/10 705/40 |
| 2013/0176842 A1* | 7/2013 | Bauchot | ............ | H04L 41/0627 370/216 |
| 2014/0325649 A1* | 10/2014 | Zhang | ................. | H04L 43/026 726/23 |
| 2016/0366035 A1* | 12/2016 | Ortega | .................... | H04L 43/04 |
| 2018/0006875 A1* | 1/2018 | Floyd, III | ........... | H04L 43/0811 |
| 2019/0089704 A1* | 3/2019 | Nagaraju | ................ | H04W 4/70 |
| 2019/0182119 A1* | 6/2019 | Ratkovic | ................. | H04L 43/06 |
| 2019/0245769 A1* | 8/2019 | Holness | .................. | H04L 43/08 |
| 2020/0366586 A1* | 11/2020 | Smarda | .................. | H04L 43/04 |
| 2021/0044498 A1* | 2/2021 | Mercian | ............. | H04L 41/5025 |
| 2021/0203591 A1* | 7/2021 | Gu | ........................ | H04L 43/065 |
| 2022/0294712 A1* | 9/2022 | Rangarajan | ............. | H04L 69/22 |
| 2022/0414500 A1* | 12/2022 | Yadav | ................. | H04L 41/5045 |
| 2023/0131255 A1* | 4/2023 | Mortensen | ............ | H04L 43/026 370/235 |

\* cited by examiner

*Primary Examiner* — Joshua Joo
(74) *Attorney, Agent, or Firm* — Select IP Law Corporation; Ashkon Cyrus

(57) ABSTRACT

In some implementations, a method of flow monitoring and identification may include identifying one or more ingress interfaces, where customer flow and traffic enters a switch. In addition, the method may include identifying one or more egress interfaces where the customer flow and traffic exits the switch. The method may include determining accurate information of the customer flow passing through the one or more ingress interfaces and the one or more egress interfaces, which includes metadata from a Layer 3 IP Header.

10 Claims, 5 Drawing Sheets

500

Monitor a plurality of egress interfaces to identify one or more identified egress interfaces continuously flapping over a specified interval
502

↓

Monitor a plurality of ingress interface counters to identify one or more ingress interfaces that are reporting egress lookup failures
504

↓

Install access control rules to monitor and collect a sample flow of customer traffic passing through the one or more identified egress interfaces and the one or more identified egress interfaces
506

↓

Collect periodic snapshots of the sample flow and exporting a plurality of metadata based on the periodic snapshots
508

↓

Save the plurality of metadata locally
510

↓

Identify, after continuous monitoring over certain intervals, one or more flows impacted by a specific egress link failure to create identified flow data
512

↓

Export the identified flow data to an external tool or controller providing accurate information to a network admin where a customer is impacted
514

FIG. 5

SYSTEMS AND METHODS FOR ACCURATE MONITORING AND REPORTING OF FLOWS IMPACTED DUE TO LINK FAILURES IN DATA CENTERS

CROSS REFERENCE TO RELATED APPLICATIONS

This application is a continuation in part of U.S. patent application Ser. No. 18/101,074 filed Jan. 24, 2023, the entirety of which is incorporated by reference.

BACKGROUND

Link failures in organizational networks may be caused by a wide range of factors such as hardware malfunctions, optical component malfunction, and incorrect physical layer configurations; these link failures can cause increase in latency, packet drops and software re-convergence. It is typically thought that network link failures are to some degree an inevitable aspect of network infrastructure operation, yet they still cause many problems for network infrastructure providers.

As an example, some network failures can result in in packet loss which may negatively impact various applications deployed in a network. If any these applications are mission-critical, then catastrophic consequences can result to end users and network operators alike. Moreover, a large proportion of link failures are caused by failed optical components thus requiring their physical replacement by data center operators (DCOs); this can incur major operational and capital expenses for the network infrastructure provider.

Another significant challenge for organizational networks is that data center administrators are typically unaware of which customer traffic is impacted by such link failures as they can only see is packets getting dropped at the ingress or egress interface. This creates major problems for network administrators (using SDN controllers) to troubleshoot, identify the critical applications impacted and migrate them towards stable network links. What is needed are systems and methods for providing identification, analytics, and reporting on the identification of customer traffic and flow impacted by link failures.

SUMMARY

Some implementations herein relate to systems and methods for accurate monitoring and reporting of flows of organizational networks impacted due to link failures in data centers. Embodiments of the present disclosure further disclose methods of identification of customer traffic and flow impacted by such link failures. After identification, targeted identified data may be exported or reported as an alert to the network admin with the accurate information on the flows.

Embodiments of the present disclosure furthermore include methods of monitoring one or more egress interfaces of a network switch to identify one or more identified egress interfaces continuously flapping beyond a specified interval. The methods may furthermore include monitoring a plurality of ingress interface counters to identify one or more ingress interfaces that are reporting egress lookup failures. The methods may in addition include installing access control rules to monitor and collect a sample flow of customer traffic passing through the one or more identified egress interfaces and the one or more identified egress interfaces.

The methods may moreover include collecting periodic snapshots of the sample flow and exporting/extracting a plurality of metadata based on the periodic snapshots. The methods may furthermore include identifying, after continuous monitoring over certain intervals, one or more flows impacted by a specific egress link failure to create identified flow data. The methods may in addition include exporting the identified flow data to an external tool or controller providing accurate information to a network admin where a customer is impacted.

Other embodiments of this aspect include corresponding computer systems, apparatus, and computer programs recorded on one or more computer storage devices, each configured to perform the actions of the methods, including via a network switch connected to a controller.

BRIEF DESCRIPTION OF THE DRAWINGS

For a more complete understanding of the present disclosure and its advantages, reference is now made to the following description taken in conjunction with the accompanying drawings, in which like reference numerals represent like parts.

FIG. 5 is a flowchart of an exemplary process for accurate monitoring and reporting of flows.

DETAILED DESCRIPTION

Figure 1:
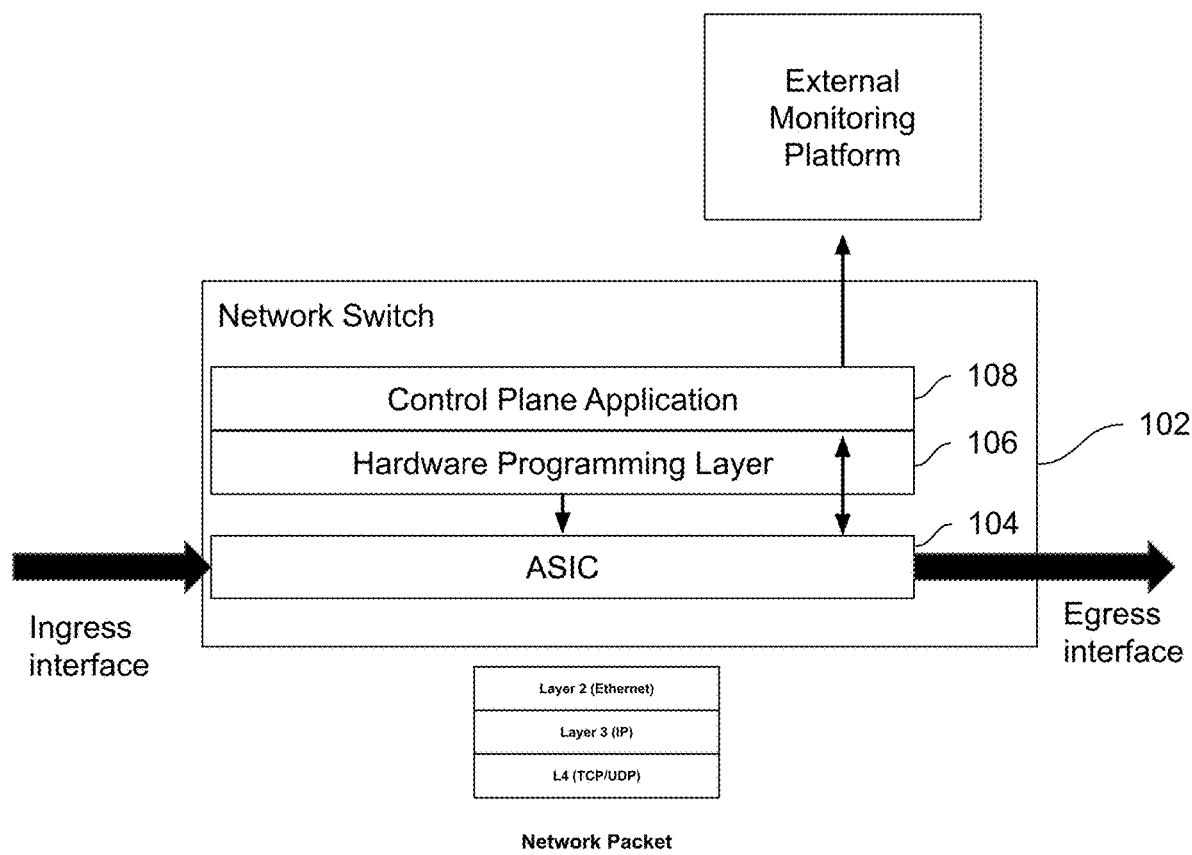
FIG. 1 illustrates a system architecture according to an embodiment of the present disclosure.

FIG. 1 illustrates system architecture according to an embodiment of the present disclosure where an ASIC 104 is integrated within switch 102. ASIC 104 performs a wide range of tasks such as forwarding and filtering packets, implementing security protocols, and managing the flow of traffic. According to an embodiment of the present disclosure, ASIC 104 is responsible for low-level, high-speed processing of network traffic and can handle a large amount of data in parallel.

According to an embodiment, ASIC 104 interacts with a Hardware Programming Layer 106, wherein the Hardware Programming Layer 106 acts as a bridge between ASIC 104 and a Control Plane Application 108. According to a further embodiment, Hardware Programming Layer 106 provides a set of APIs (also defined as Hardware Programming APIs) that allow Control Plane Application 108 to configure and control ASIC 104.

It can be appreciated that the Hardware Programming APIs provide a high-level abstraction of the functionality of ASIC 104 thus allowing Control Plane Application 108 to program the ASIC 104 without needing to know any low-level details of ASIC 104.

According to a further embodiment, a hashing algorithm is provided to determine the path that a packet should take based on certain fields in the packet header. These fields can include, for example, the source and destination IP address, source and destination port, and protocol. According to an embodiment, an ECMP (Equal-Cost Multi-Path) hash calculator is provided to distribute network traffic across multiple paths of equal cost. It can be appreciated that the ECMP hash calculator ensures that packets with the same fields are consistently sent down the same path, providing a consistent and predictable flow of traffic.

According to an embodiment, Control Plane Application 108 is responsible for managing the overall behavior of switch 102, configuring security policies, and monitoring the network's performance. According to a further embodiment, an Ingress interface 110 is installed for accounting for the critical application flows ingressing to ASIC 104 and an Egress interface 112 is installed for accounting the critical application flows egressing from ASIC 104. According to a further embodiment, a NOS (Network Operating System) agent is provided as part of Control Plane Application 108, wherein the NOS agent communicates with a plurality of network devices to gather information and make changes to the network configuration. The agent may also communicate with the system processor to receive instructions and report back on the status of the network. Other services that may be provided in the Control Plane Application 108 may include Network Management services, Network Security Services, Network Analytics services, and other related Automation and Coordination services.

All of the services in Control Plane Application 108 seamlessly interact such that the network is operating efficiently and effectively. According to a further embodiment, all of the services in Control Plane Application 108 are controlled by the NOS agent.

According to a further embodiment, Access control lists (ACLs) are implemented into ASIC 104 wherein the ACLs are used to filter packets based on predetermined criteria. Predetermined criteria may include source and destination IP addresses, port numbers, and protocol, and state information. Embodiments of the present disclosure may include various ACLs that are commonly used by ASIC vendors including IP, MAC, VLAN, Protocol, and Stateful ACLs.

According to a further embodiment, the ACLs are applied as a pair both on Ingress interface 110 and egress interface 112. According to a further embodiment, multiple ingress interfaces and egress interfaces are provided, wherein the ingress interfaces are installed for accounting for the critical application flows ingressing to ASIC 104 and the Egress interfaces are installed for accounting the critical application flows egressing from ASIC 104.

Figure 2:
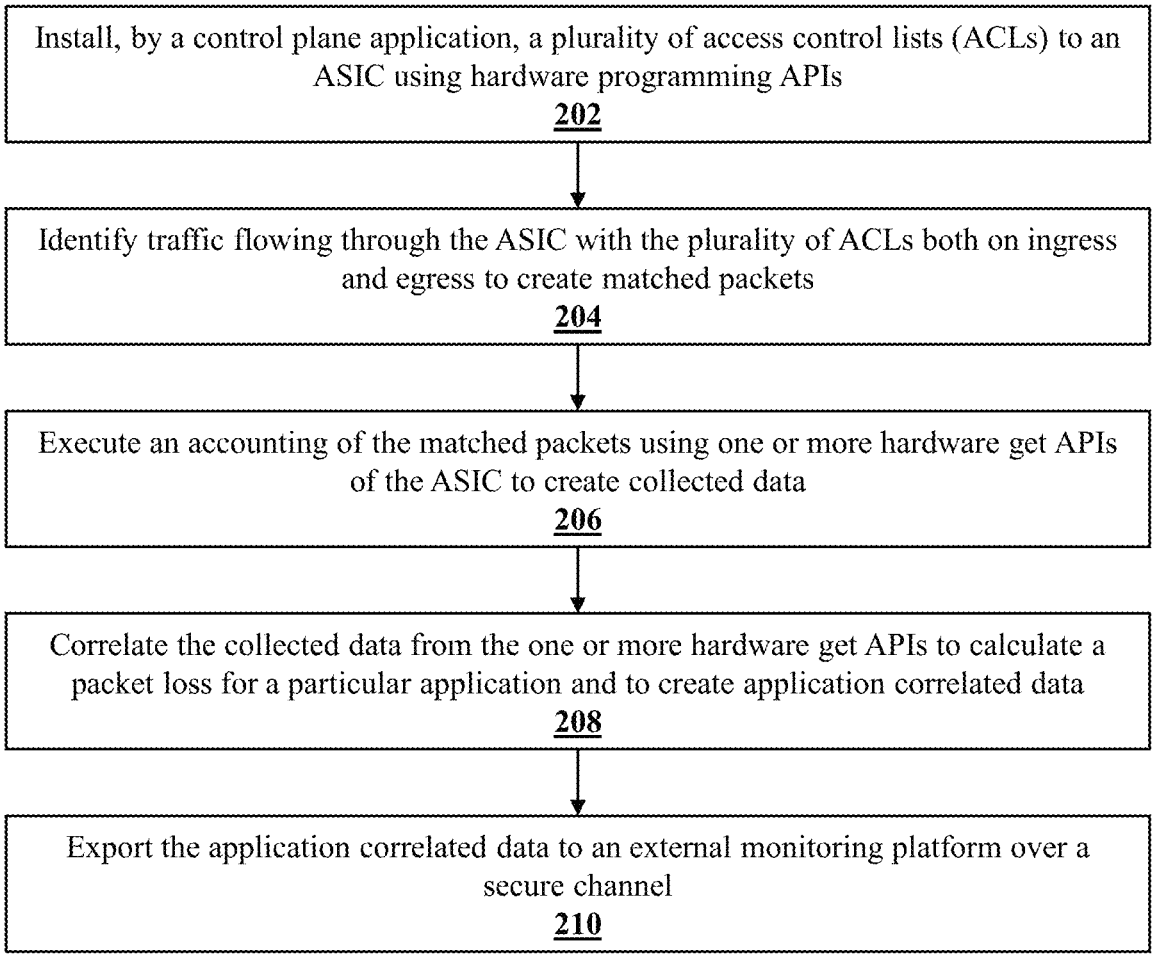
FIG. 2 is a flowchart of an example process for providing insights, analytics, and monitoring on the criticality of applications impacted by link failures.

FIG. 2 is a flowchart of an exemplary process 200 for providing insights, analytics, and monitoring on the criticality of applications impacted by link failures according to an embodiment of the present disclosure. In some implementations, one or more process blocks of FIG. 2 may be performed by a switch device containing a processor that executes instructions to implement a Control Plane Application.

As shown in FIG. 2, process 200 may include installing, by a control plane application, a plurality of access control lists (ACLs) to an ASIC using hardware programming APIs (block 202). A switch device can install a plurality of access control lists (ACLs) to an ASIC using a variety of hardware programming APIs. According to an embodiment the method uses a command line interface (CLI) to configure the ACLs on the switch. In an alternative embodiment, the method uses a software development kit (SDK) that provides APIs for programming the ASIC directly. Additionally, some switch devices may also allow for the use of Open-Flow or other network protocol to program the ACLs onto the ASIC. Another embodiment implements a web-based interface thus allowing for the creation and management of ACLs through a web browser accessible to the responsible parties. According to yet another embodiment, a configuration file is utilized to install multiple ACLs on the switch, where this file may be uploaded via a USB or via a network management protocol.

As also shown in FIG. 2, process 200 may include identifying traffic flowing through the ASIC with the plurality of ACLs both on ingress and egress to create matched packets (block 204). For example, device may identify traffic flowing through the ASIC with the plurality of ACLs both on ingress and egress to create matched packets using packet headers, which contain information such as source and destination IP addresses, port numbers, and protocol type. Another method of identifying traffic flowing through the ASIC with the plurality of ACLs both on ingress and egress utilizes packet payload, which can be searched for specific keywords or patterns. According to another embodiment flow-based identifications are utilized such that ASIC uses five-tuple information (source IP, destination IP, source port, destination port and protocol).

As further shown in FIG. 2, process 200 may include executing an accounting of the matched packets using one or more hardware get APIs of the ASIC to create collected data (block 206). Hardware get APIs may include one or more register read APIs, memory read APIs and counter read APIs. Registers read APIs may contain information such as the current status of the ASIC, configuration settings, or performance statistics. Additionally, memory locations may contain information such as packet buffers, forwarding tables, or other data structures used by the ASIC. It can be appreciated that counter read APIs may track information such as the number of packets processed, the number of packets dropped, or the number of errors encountered.

As also shown in FIG. 2, process 200 may include correlating the collected data from the one or more hardware get APIs to calculate a packet loss for a particular application and to create application correlated data (block 208). As further shown in FIG. 2, process 200 may include exporting the application correlated data to an external monitoring platform over a secure channel (block 210). According to embodiment the method utilizes secure file transfer protocol (SFTP) or secure shell (SSH) to securely transfer the application correlated data from the switch to the external platform. Another embodiment utilizes a secure message-oriented protocol such as MQTT, AMQP, or HTTPS to transfer the application correlated data, such that application correlated data remains encrypted while it is in transit between the switch and the external platform. The switch can also use a secure protocol such as SNMPv3 to export application correlated data to the external platform such that the protocol provides encryption and authentication mechanisms to secure the data.

Process 200 may include additional implementations, such as any single implementation or any combination of implementations described below and/or in connection with one or more other processes described elsewhere herein. In a first implementation, traffic is identified to create matched packets by using layer 3 IP header information.

In a second implementation, alone or in combination with the first implementation, header information includes a Source IP and a Destination IP combined with TCP port numbers.

In a third implementation, alone or in combination with the first and second implementation, the plurality of ACLs are applied permanently to monitor and collect a loss.

In a fourth implementation, alone or in combination with one or more of the first through third implementations, the plurality of ACLs are installed on a demand basis.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

According to an embodiment of the present disclosure, as an initial step of calculating application packet loss in the system, a processor is configured to identify a flow using the Layer 3 IP header information which includes the Source/Destination IP combined with TCP port numbers. After the flow is identified, flow statistics can be collected using the ACLs. In one embodiment, the ACLs can be applied permanently to monitor and collect the loss. In another embodiment, ACLs can be installed on a demand basis.

According to an embodiment, one or more ingress interface(s) are provided for directly connected hosts at the first hop and for correlating the egress interface from the ECMP hash calculator for a given flow and LLDP information for peer connectivity.

According to an embodiment, the egress interface(s) can be derived based on the ECMP hash calculator supported by ASIC vendors or list of next hops. The ingress and egress interfaces can also be identified using the various tiers in the data center fabric. It can be appreciated that application traffic direction can be used to derive the ingress interfaces and egress interfaces. For example, on a leaf device, a "TOR-to-Leaf" connected interface can be used as an ingress interface and a "Leaf-to-Spine" connected interface can be used as egress interface.

According to this embodiment, once the ACLs are installed for the critical application flows, the statistics are collected by the NOS agent running in the control plane as a service. During normal operation, ingress and egress ACLs will have the same number of packets accounted for. On link failure, the system may calculate packet loss by determining the difference between the ingress and the egress ACL count, such that this calculation will give the packet loss for the critical flow due to this event. According to a further embodiment, the NOS agent performs a correlation of this packet loss with the link failure event on the device to create correlated information and related insights. The correlated information can be exported as a critical event to the alerting or ticketing system of the infrastructure provider.

According to a further embodiment, the infrastructure provider interacts with DCOs (Data Center Operators) take proactive measures to prevent any critical events from becoming major problems. For example, the infrastructure providers may review the insights created from the correlated data including critical event information and relay this information to the DCOs as only these critical events need to be addressed with high priority by the DCOs. According to an embodiment, in addition to doing the correlation, correlation data, counters, and insights are continuously exported to external monitoring systems for historical analysis to create historical data. The historical data can help the DCOs identify the optical components and systems causing the majority of the outages and eventually make decisions on future Capital Expenditure (CAPEX) for a particular Optics vendor.

According to a further embodiment, after critical applications have been isolated, non-critical applications can be optimized at the hosts for latency. One method of optimizing is by increasing the TCP timeouts. It can be appreciated that this will reduce the Operating Expenditure (OPEX) for infrastructure providers for handling link failures in the network.

Figure 3:
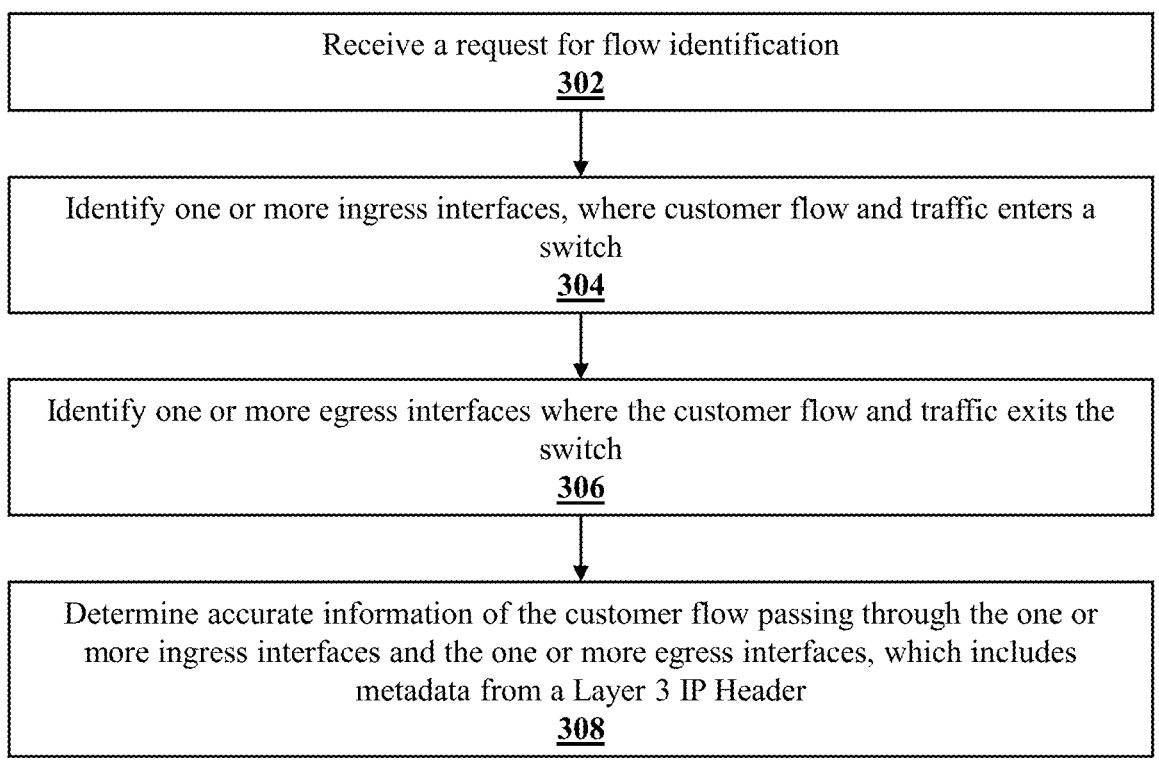
FIG. 3 is a flowchart of an exemplary process for flow detection according to an embodiment of the present disclosure.

FIG. 3 is a flowchart of an exemplary process 300 of flow identification. In some implementations, one or more process blocks of FIG. 3 may be performed by a control plane application. Flow identification will be useful to detect troubleshoot any impacted critical applications. As an example, consider a data center application that performs health checks on ISP provider IP prefixes and detects unreachability failures, but it cannot distinguish between a link failure and simply reporting the ISP as unreachable. The data canter application may need to request flow identification to further troubleshoot the problem, or it would run the risk of erroneously reporting the ISP as unreachable.

As shown in FIG. 3, process 300 may include receiving a request for flow identification (block 302). As also shown in FIG. 3, process 300 may include identifying one or more ingress interfaces, where customer flow and traffic enters a switch (block 304). As further shown in FIG. 3, process 300 may include identifying one or more egress interfaces where the customer flow and traffic exits the switch (block 306). As also shown in FIG. 3, process 300 may include determining accurate information of the customer flow passing through the one or more ingress interfaces and the one or more egress interfaces, which includes metadata from a Layer 3 IP Header (block 308). Metadata may include additional information that is associated with data. For example, according to an embodiment of the present disclosure, metadata may include information about the source and destination IP addresses, Differentiated Services Code Point (DSCP) value(s), and the source and destination ports in the Layer 4 TCP/UDP header. This metadata can provide valuable insights into the nature and origin of the data being transmitted and can be used for various purposes such as network monitoring, security, and troubleshooting.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
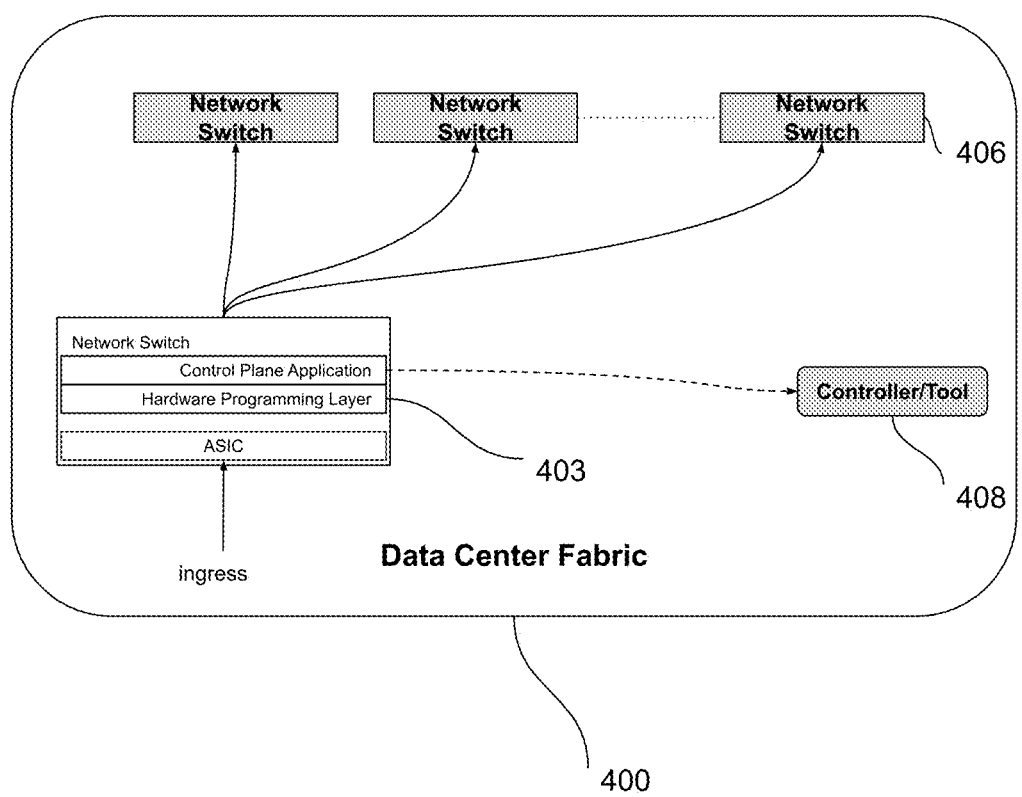
FIG. 4 illustrates a system architecture according to an embodiment of the present disclosure.

FIG. 4 shows a system architecture of a data center fabric 400 according to an embodiment of the present disclosure. Network switch 403 is a key component in data center fabric 400 that connects one or more devices within the network. As shown in FIG. 4, network switch 403 may be in communication with a controller 408 which is responsible for managing and directing traffic within the network. According to an embodiment, controller 408 receives information from network switch 403 and makes decisions on how to route data to its intended destination.

Network switch 403 may be configured with one or more egress interfaces configured to connect network switch 403 to a plurality of other network switches 406. This setup allows for data to be transmitted to multiple devices and destinations within the network. Additionally, network switch 403 is configured with one or more ingress interfaces that are configured to receive data from other devices and switches in the network.

FIG. 5 is a flowchart of an example process 500 of flow identification according to an embodiment of the present disclosure. In some implementations, one or more process blocks of FIG. 5 may be performed by a control plane application running on a network switch.

As shown in FIG. 5, process 500 may include monitoring a plurality of egress interfaces for link failure to identify one or more identified egress interfaces continuously flapping over a specified interval (block 502). According to an embodiment the egress interfaces are continuously monitored for link failure by checking if the flapping occurs beyond the specified interval. According to an embodiment the specified interval is a configured threshold. According to an embodiment the egress interfaces further include counters configured to monitor the status of network links and to detect egress lookup failures. These counters are configured to toggle a status variable between up and down and to determine a link flap count, where a link flap is an event that occurs when a network link goes down and then comes back up within a predetermined period of time. The egress counters are used to detect these flaps and to record the number of times they occur. This information can be used to identify and diagnose problems in accordance with the other steps of the described methods of the present disclosure.

As also shown in FIG. 5, process 500 may include monitoring a plurality of ingress interface counters to identify one or more ingress interfaces that are reporting egress lookup failures (block 504). For example, control plane application may monitor a plurality of ingress interface counters to identify the specific ingress interfaces which are reporting egress lookup failures, as described above. As further shown in FIG. 5, process 500 may include installing access control rules to monitor and collect a sample flow of customer traffic passing through the one or more identified egress interfaces and the one or more identified egress interfaces (block 506).

These access control rules may be used to control and regulate the flow of data traffic on the network, allowing network administrators to monitor network activity and collect data on customer traffic patterns. According to an embodiment, the control plane application monitors traffic passing through the identified egress interfaces in order to gain insights into how customers are using the network and to identify any potential issues or bottlenecks, as described in the following paragraphs.

That is, process 500 may include collecting periodic snapshots of the sample flow and exporting a plurality of metadata based on the periodic snapshots (block 508). The periodic snapshots provide a snapshot of the network activity at specific intervals, and the metadata extracted from them provide valuable insights into network usage patterns and trends. As further shown in FIG. 5, process 500 may include saving the plurality of metadata locally (block 510). For example, control plane application may save the plurality of metadata locally, as described above. Metadata may include additional information that is associated with data. For example, according to an embodiment of the present disclosure, metadata may include information about the source and destination IP addresses, Differentiated Services Code Point (DSCP) value(s), and the source and destination ports in the Layer 4 TCP/UDP header. This metadata can provide valuable insights into the nature and origin of the data being transmitted and can be used for various purposes such as network monitoring, security, and troubleshooting.

As also shown in FIG. 5, process 500 may include identifying, after continuous monitoring over certain intervals, one or more flows impacted by a specific egress link failure to create identified flow data (block 512). For example, control plane application may identify one or more flows impacted by a specific egress which is experiencing latency issues to create identified flow data, as described above.

As further shown in FIG. 5, process 500 may include exporting the identified flow data to an external tool or controller providing accurate information to a network admin where a customer is impacted (block 514). According to an embodiment the control plane application may export the identified flow data to an external tool or controller to be used to identify specific areas of the network where there are bottlenecks or other issues that may be impacting customer service.

By exporting this data to an external tool or controller, network administrators are able to identify the source of the problem and take appropriate action to resolve it. This helps to ensure that customer service is maintained at the highest level possible, and that network issues are resolved quickly and efficiently.

Process 500 may include additional implementations, such as any single implementation or any combination of implementations described below and/or in connection with one or more other processes described elsewhere herein. In a first implementation, the identified one or more egress interfaces are identified when a link flap count is greater than a configured threshold and continuously flapping further may include toggling a status between down and up.

In a second implementation, alone or in combination with the first implementation, the metadata further may include Layer 3 and Layer 4 header information.

A third implementation, alone or in combination with the first and second implementation, process 500 may include optimizing route programming in a data center based on the identified flow data to steer network traffic towards reliable network links.

In a fourth implementation, alone or in combination with one or more of the first through third implementations, the access control rules further may include TCAM rules.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides is not intended to be exhaustive or to limit the implementations to the precise form disclosed. Modifications may be made in light of the above disclosure or may be acquired from practice of the implementations.

Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more."

Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more."

Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
monitoring a plurality of egress interfaces to identify one or more identified egress interfaces flapping above a configured threshold over a specified interval;
monitoring a plurality of ingress interface counters to identify one or more ingress interfaces that are reporting egress lookup failures;
installing access control rules to monitor and collect a sample flow of customer traffic passing through the one or more identified ingress interfaces and the one or more identified egress interfaces;
collecting periodic snapshots of the sample flow and exporting a plurality of metadata based on the periodic snapshots;
saving the plurality of metadata locally;
identifying one or more flows impacted by a specific egress link failure to create identified flow data; and
exporting the identified flow data to an external tool or controller providing accurate information to a network admin where a customer is impacted.

2. The method of claim 1, wherein the identified one or more egress interfaces are identified when a link flap count is greater than a configured threshold and continuously flapping further comprises toggling a status between down and up.

3. The method of claim 1 wherein the access control rules further comprise TCAM rules.

4. The method of claim 2, wherein the metadata further comprises Layer 3 and Layer 4 header information.

5. The method of claim 4, further comprising re-programming routes in a data center based on the identified flow data.

6. A device comprising:
one or more processors configured to:
monitor a plurality of egress interfaces to identify one or more identified egress interfaces flapping above a configured threshold over a specified interval;
monitor a plurality of ingress interface counters to identify one or more ingress interfaces that are reporting egress lookup failures;
install access control rules to monitor and collect a sample flow of customer traffic passing through the one or more identified ingress interfaces and the one or more identified egress interfaces;
collect periodic snapshots of the sample flow and exporting a plurality of metadata based on the periodic snapshots;
save the plurality of metadata locally;
identify, after continuous monitoring over certain intervals, one or more flows impacted by a specific egress link failure to create identified flow data; and
export the identified flow data to an external tool or controller providing accurate information to a network admin where a customer is impacted.

7. The device of claim 6, wherein the identified one or more egress interfaces are identified when a link flap count is greater than a configured threshold and continuously flapping, are configured to toggle a status between down and up.

8. The device of claim 7, wherein the metadata further comprises Layer 3 and Layer 4 header information.

9. The device of claim 8, wherein the one or more processors are further configured to: re-program routes in a data center based on the identified flow data.

10. The device of claim 6, wherein the access control rules further comprise TCAM rules.

* * * * *